(12) United States Patent
Schaak (10) Patent No.: US 11,940,065 B2
(45) Date of Patent: Mar. 26, 2024

(54) CONNECTOR AND ASSOCIATED LIGHTING ASSEMBLY

(71) Applicant: Lee Schaak, Dix Hills, NY (US)

(72) Inventor: Lee Schaak, Dix Hills, NY (US)

(73) Assignee: Adesso Inc., New York, NY (US)

( * ) Notice: Subject to any disclaimer, the term of this patent is extended or adjusted under 35 U.S.C. 154(b) by 0 days.

(21) Appl. No.: 17/015,708

(22) Filed: Sep. 9, 2020

(65) Prior Publication Data

US 2022/0074526 A1 Mar. 10, 2022

(51) Int. Cl.
*F21S 6/00* (2006.01)
*F16L 15/00* (2006.01)

(52) U.S. Cl.
CPC .............. *F16L 15/006* (2013.01); *F21S 6/005* (2013.01)

(58) Field of Classification Search
CPC ........... F16L 15/006; F16B 7/18; F16B 7/182; F16B 7/0413; F21S 6/005; F21V 21/06; F21V 21/14
USPC ........ 285/272, 397; 362/250, 410, 391, 392, 362/395, 431, 450, 449; 403/292, 296
See application file for complete search history.

(56) References Cited

U.S. PATENT DOCUMENTS

| | | | |
|---|---|---|---|
| 376,750 A * | 1/1888 | Murphy | B23K 1/0012 228/136 |
| 826,437 A * | 7/1906 | Miller | H02G 3/0616 285/149.1 |
| 2,239,026 A * | 4/1941 | Wagner | H01R 4/5025 403/275 |
| 3,342,511 A * | 9/1967 | Galloway | F21V 21/10 285/149.1 |
| 3,381,978 A * | 5/1968 | Faustini | F16L 33/24 285/40 |
| 3,871,692 A * | 3/1975 | Brownfield | F16L 15/08 285/390 |
| 3,882,450 A * | 5/1975 | Janssen | F21S 6/005 362/395 |
| D243,406 S | 2/1977 | Mooney et al. | |
| 4,067,656 A * | 1/1978 | Dennis | F16B 12/48 411/395 |
| D276,879 S | 12/1984 | Bell | |
| 4,564,225 A | 1/1986 | Taylor | |
| 4,708,555 A | 11/1987 | Terry | |
| D311,131 S | 10/1990 | Saito | |
| 5,044,676 A | 9/1991 | Burton et al. | |
| 5,149,149 A * | 9/1992 | Wu | F16B 7/0413 285/396 |

(Continued)

*Primary Examiner* — David Bochna
(74) *Attorney, Agent, or Firm* — King & Partners, PLC (57) ABSTRACT

A connector for use in association with a lighting assembly that allows for components to be quickly assembled in an easily aligned configuration, including: a body having a first end, a second end, an interior sidewall, and an exterior sidewall; wherein the first end of the body and the second end of the body define a length therebetween; wherein a portion of the exterior sidewall of the body is threaded proximate the first end; wherein a portion of the exterior sidewall of the body is non-threaded proximate the second end; a first aperture associated with the first end of the body; a second aperture associated with the second end of the body; and a conduit positioned between the first aperture and the second aperture, wherein the conduit is adapted for containing an electrical cord from an associated lighting assembly.

1 Claim, 12 Drawing Sheets (56) References Cited

U.S. PATENT DOCUMENTS

| | | | |
|---|---|---|---|
| 5,168,943 A * | 12/1992 | Falgout, Sr. | E21B 7/067 |
| | | | 175/256 |
| 5,456,620 A | 10/1995 | Kaminski | |
| 5,762,671 A | 6/1998 | Farrow et al. | |
| 5,823,702 A | 10/1998 | Bynum | |
| 5,826,975 A * | 10/1998 | Hsieh | F21V 21/06 |
| | | | 362/438 |
| D412,738 S | 8/1999 | Kuwabara | |
| 5,954,426 A * | 9/1999 | Whittington | F21V 21/06 |
| | | | 362/431 |
| 6,056,324 A | 2/2000 | Reimert et al. | |
| 6,039,463 A * | 3/2000 | Lin | F21S 6/002 |
| | | | 362/410 |
| 6,264,350 B1 * | 7/2001 | Swanson | F21S 6/008 |
| | | | 362/410 |
| 6,394,632 B1 * | 5/2002 | Phillips | F21S 6/005 |
| | | | 362/394 |
| D476,873 S | 7/2003 | Carroll | |
| 6,726,395 B2 * | 4/2004 | Yu | F16B 7/182 |
| | | | 403/296 |
| 6,935,891 B2 | 8/2005 | Kiely | |
| D531,888 S | 11/2006 | Barnes | |
| D577,683 S | 9/2008 | Chawgo et al. | |
| 7,631,902 B2 * | 12/2009 | Vrame | H02G 3/383 |
| | | | 52/220.8 |
| D691,033 S | 10/2013 | Allman | |
| 8,550,843 B2 | 10/2013 | Van Swearingen | |
| 8,944,838 B2 | 2/2015 | Mulfinger | |
| 8,992,148 B2 | 3/2015 | Schafer et al. | |
| D779,046 S | 2/2017 | Tansey, Jr. | |
| D815,516 S | 4/2018 | Karmarkar et al. | |
| D845,474 S | 4/2019 | Gloria Bello et al. | |
| 2004/0018043 A1 * | 1/2004 | Yu | F16B 7/182 |
| | | | 403/109.4 |
| 2004/0140669 A1 | 7/2004 | Powers et al. | |
| 2004/0156674 A1 * | 8/2004 | Ko | F16B 12/36 |
| | | | 403/292 |
| 2008/0277880 A1 | 11/2008 | Begley et al. | |
| 2015/0180141 A1 | 6/2015 | Wei | |
| 2017/0370162 A1 | 12/2017 | Carrois et al. | |

* cited by examiner

CONNECTOR AND ASSOCIATED LIGHTING ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to connectors and, more particularly, to connectors for use in assembling components in a fast and easily aligned configuration. The connectors of the present invention are preferably associated with, for example, residential, commercial, and industrial interior and/or exterior lighting assemblies.

2. Background Art

Connectors, fasteners and associated lighting assemblies have been known in the art for years and are the subject of a plurality of patents and publications, including: U.S. Pat. No. 8,992,148 entitled "Locking Connector," U.S. Pat. No. 8,944,838 entitled "Connector with Locking Ring," U.S. Pat. No. 8,550,843 entitled "Tabbed Connector Interface," U.S. Pat. No. 6,935,891 entitled "Snap Fitting Electrical Connector," U.S. Pat. No. 6,056,324 entitled "Threaded Connector," U.S. Pat. No. 5,762,671 entitled "Multi-Size Threaded Adapter," U.S. Pat. No. 5,456,620 entitled "Connector Assembly for Lamps," U.S. Pat. No. 4,708,555 entitled "Locking Fastener," United States Patent Application Publication Number 2015/0180141 entitled "Coaxial Cable Connector and Threaded Connector," and United States Patent Application Publication Number 2008/0277880 entitled "Connector Assembly"—all of which are hereby incorporated herein by reference in their entirety including all references cited therein.

U.S. Pat. No. 8,992,148 appears to disclose a self-locking connector system that has a connector member having an external thread and an axially extending keyway, and a connecting interface at a distal end. A connector body has a distal end with a connecting interface that mates with the connecting interface of the connector member. An internally threaded nut is captive on the distal end of the connector body encircling the connecting interface and is configured to screw onto the externally threaded connector member. A locking collar is dimensioned to encircle the externally threaded connector member, has at least one key dimensioned to engage in the keyway, and is movable axially on the nut between a first position in which the nut is rotatable relative to the collar and a second position in which the nut is not rotatable relative to the collar.

U.S. Pat. No. 8,944,838 appears to disclose a connector for mating with a mating connector. The connector includes a housing having an internal compartment and a locking segment. A contact is held within the internal compartment of the housing. A locking ring extends around the housing. The locking ring has a latch that is configured to cooperate with a latch member of the mating connector to lock the connector and the mating connector together. The connector includes a first actuator configured to compress the locking ring radially inward or expand the locking ring radially outward to release the latch of the locking ring from the latch member of the mating connector. The locking segment of the housing includes a second actuator that is configured to compress the locking ring radially inward or expand the locking ring radially outward to release the latch of the locking ring from the latch member of the mating connector.

U.S. Pat. No. 8,550,843 appears to disclose a connector interface that has a male portion and a female portion. The male portion is provided with at least three outer diameter radial projecting connector tabs and a conical outer diameter seat surface at an interface end. A lock ring provided with a stop shoulder and at least three radial inward coupling tabs at the interface end seats around the male portion, the stop shoulder abutting the connector tabs, a tab seat provided between the coupling tabs and the stop shoulder. The female portion provided with at least three outer diameter radial projecting base tabs and an annular groove open to the interface end with an outer sidewall dimensioned to mate with the conical outer diameter seat surface. The base tabs engage the coupling tabs when the lock ring is rotated to insert the base tabs into the tab seat, retaining the outer diameter seat surface against the outer sidewall.

U.S. Pat. No. 6,935,891 appears to disclose a connector having an inlet end and an outlet end wherein the leading or outlet end with a pair of spaced apart shoulders defining therebetween an annular recess and a snap fit retainer ring fitted onto the outlet end, the retainer ring having at least two series of spring tangs blanked out of the plane thereof, and which tangs are formed to effect a positive grounding connection with an associated electric box in the event any slight deviations are encountered within the parameters of the adopted standards, and whereby the annular recess functions to provide a relief for the spring tangs to facilitate and minimize the required insertion force and to insure a positive ground connection between the connector and the electrical box in the assembled position. In another embodiment, the snap fit retaining ring is provided with longitudinally and/or laterally spaced depressions transversely the width of the snap fit retaining ring for use on a connector formed with a threaded end.

U.S. Pat. No. 6,056,324 appears to disclose a method and apparatus to complete a threaded connection between two connector members by relative rotation between the connectors, utilizing fluid pressure between them to overcome radial load resistance during make up by rotation, and thereafter to produce axial and radial loading in the completed connection, but without otherwise applying longitudinal forces to drive the two connectors together to make up the threaded connection. In one embodiment, a pin connector has a tapered neck with external threads, and a box connector has a collar with a tapered interior, featuring tapered threads. The pin neck is received within the box collar, and the two sets of threads are made up by relative rotation between the pin and box. When a stall position is reached due to radial resistance forces, two combinations of bump and ramp seals provide a sealed zone between the sets of threads. Fluid pressure is applied in the sealed zone to radially contract the neck and expand the collar without breaking the sealing engagement between the bump seals and the ramp seals. The resulting reduction of radial resistance between the neck and collar allows the further threading of the pin and box together by rotation between them until load surfaces of the pin and box mutually engage. Subsequent release of the fluid pressure from the sealed zone allows the pin neck to expand and the box collar to contract, moving the two sets of threads together, and radially loading the engagement at the seals. The load surfaces of the pin and box threads are slanted so that a wedging action is produced that further axially loads the connected pin and box.

U.S. Pat. No. 5,762,671 appears to disclose a connector/adapter which enables a person to use different, selected, sizes of inexpensive, readily available, oil or air filters to act as air filters to provide greater air filtration for hydraulic systems. The connector/adapter includes a body having an axial central opening therethrough; an enlarged, cylindrical, central section having first and second opposed surfaces; a first end section extending from the first surface of the central section and having an enlarged, externally, threaded portion; a smaller, externally, threaded portion extending from the enlarged externally threaded portion; a reduced cylindrical section attached to the second surface of the enlarged, cylindrical, section of the body; and a male bayonet locking member fixed to the free end of the reduced cylindrical section of the body for engagement with a female receptacle member attached to a fluid reservoir. The enlarged, externally, threaded portion and the smaller, externally, threaded portion being adapted to be selectively engaged with different sized internally threaded openings in conventional, standard, oil filters.

U.S. Pat. No. 5,456,620 appears to disclose a connector assembly for lamps such as lamps which are used for automotive signaling lamps that includes a single adaptor plug which, at a first end, plugs into a socket fixed to the signal light assembly and at a second end has a socket for receiving a flat sealed end of a bulb. The adaptor plug includes a pair of electrical contacts therein each of which has a female electrical connector at both ends. One end of each female electrical connector receives a blade of a wire lead contact while the other end receives the flattened, sealed end of the bulb and makes contact with one of the bulb terminals. The adaptor includes a lug projecting from a surface thereof which lug is received in a recess in a spring arm latch mounted on the socket. By utilizing the aforedescribed adaptor plug, a simpler, more reliable, less expensive connector assembly for automotive lamps is provided.

U.S. Pat. No. 4,708,555 appears to disclose a locking fastener in which ramp surfaces are employed to generate wedging forces in response to backing-off movement of the associated nut which urges the nut into tighter engagement with the associated bolt and workpiece and in which spring means are provided which are compressed during the tightening operation and which bias the ramp surfaces for movement in a direction to augment the locking action of the fastener.

United States Patent Application Publication Number 2015/0180141 appears to disclose a coaxial cable connector that is configured to engage with an outer thread of a threaded connector. The coaxial cable connector comprises an inner sleeve, an outer sleeve arranged around the inner sleeve and a nut arranged around the inner sleeve. The nut comprises a metal sheet integral with an inner flange of the nut, wherein the metal sheet is between the inner flange and a cylindrical surface of the inner sleeve. The metal sheet has a fixed side, close to an outer flange of the inner sleeve, fixed to the inner flange of the nut, and a free side, away from the outer flange of the inner sleeve, abutting against the cylindrical surface of the inner sleeve. An empty gap is between the metal sheet and the inner flange. When the nut comprises an inner thread engaging with the outer thread, the outer flange is configured to be between the inner flange and the threaded connector.

United States Patent Application Publication Number 2008/0277880 appears to disclose a connector assembly comprising a first hollow member which may be in the form of a first casing, and a second hollow member which may be in the form of a second casing. The first casing has a first end adapted to releasably retain a second end of the second casing therein. The connector assembly further comprises a jacket secured around a first outer portion adjacent the first end of the first casing, and a second outer portion adjacent the second end of the second casing. In use the jacket bears against or is adjacent to a wall of a bore of a well. A sealed cavity is defined between the jacket and the outer portions of the casings. When the connector is assembled the cavity is filled with a fluid and is in fluid communication with a vent. During disconnection of the first casing from the second casing, the fluid in the cavity is discharged from the cavity through the vent allowing the jacket to move inwardly away from the bore wall to assist removal of the first casing from the bore as it detaches from the second casing.

While the above-identified patents and publications do appear to disclose various connectors, fasteners, and associated lighting assemblies, their configurations remain non-desirous and/or problematic inasmuch as, among other things, none of the above-identified connectors appear to facilitate convenient assembly of components in an aligned configuration.

These and other objects of the present invention will become apparent in light of the present specification, claims, and drawings.

SUMMARY OF THE INVENTION

The present invention is directed to a connector for use in association with a lighting assembly that allows for components to be quickly assembled in an easily aligned configuration, comprising, consisting essentially of, and/or consisting of: (a) a body having a first end, a second end, an interior sidewall, and an exterior sidewall; (b) wherein the first end of the body and the second end of the body define a length therebetween; (c) wherein a portion of the exterior sidewall of the body is threaded proximate the first end; (d) wherein a portion of the exterior sidewall of the body is non-threaded proximate the second end; (e) a first aperture associated with the first end of the body; (f) a second aperture associated with the second end of the body; and (g) a conduit positioned between the first aperture and the second aperture, wherein the conduit is adapted for containing an electrical cord from an associated lighting assembly.

In a preferred embodiment of the present invention, the threaded portion of the exterior of the sidewall of the body proximate the first end and the non-threaded portion of the exterior of the sidewall of the body proximate the second end cooperatively enable a first component and a second component of the lighting assembly to be quickly assembled in an easily aligned configuration.

In another preferred embodiment of the present invention, the body is generally tubular and includes an annular interior and/or exterior sidewall.

In yet another preferred embodiment of the present invention, the interior sidewall of the body is non-threaded.

In one embodiment of the present invention, the conduit is positioned substantially (i.e., +/−15 degrees) parallel and/or parallel to the length of the body.

In a preferred embodiment of the present invention, the ratio of surface area of the threaded portion of the exterior sidewall of the body to the non-threaded portion of the exterior sidewall of the body ranges from approximately (i.e., +/−15 percent) 1:1 to approximately 10:1.

In another preferred embodiment of the present invention, the ratio of surface area of the threaded portion of the exterior sidewall of the body to the non-threaded portion of the exterior sidewall of the body ranges from approximately 4:1 to approximately 6:1.

In yet another preferred embodiment of the present invention, the ratio of surface area of the threaded portion of the exterior sidewall of the body to the non-threaded portion of the exterior sidewall of the body is approximately 5:1.

In one aspect of the present invention, the connector is fabricated from a metal, a metal alloy, a natural resin, a synthetic resin, a plastic, a composite, wood, and/or combinations thereof.

The present invention is also directed to a lighting assembly, comprising, consisting essentially of, and/or consisting of: (a) a first generally tubular component, wherein at least a portion of an interior sidewall of the first generally tubular component is threaded; (b) a second generally tubular component, wherein at least a portion of an interior sidewall of the second generally tubular component is threaded; and (c) a connector, comprising: (1) a body having a first end, a second end, an interior sidewall, and an exterior sidewall; (2) wherein the first end and the second end of the body define a length therebetween; (3) wherein a portion of the exterior sidewall of the body is threaded proximate the first end; (4) wherein a portion of the exterior sidewall of the body is non-threaded proximate the second end; (5) a first aperture associated with the first end of the body; (6) a second aperture associated with the second end of the body; (7) a conduit positioned between the first aperture and the second aperture, wherein the conduit is adapted for containing an electrical cord from an associated lighting assembly; and (8) wherein the threaded region proximate the first end and the non-threaded region proximate the second end cooperatively enable the first component and the second component of the lighting assembly to be quickly assembled in an easily aligned configuration.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1-8 in particular, connector 10, for use in association with a lighting assembly that allows for components to be quickly assembled in an easily aligned configuration, is shown as generally comprising generally tubular body 12 having first end 14, second end 16, generally annular interior sidewall 18, and generally annular exterior sidewall 20. The first end of the body and the second end of the body define a length (L) therebetween. A portion 22 of exterior sidewall 20 of body 12 is threaded proximate first end 14. A portion 24 of exterior sidewall 20 of body 12 is non-threaded proximate second end 16. Connector 10 includes first and second apertures 26 and 28, respectively. Conduit 30 is positioned between the first aperture and the second aperture, and is adapted for containing an electrical cord from an associated lighting assembly (e.g., electrical plug/cord, components/rods, light source/bulb, shade, etc.; see FIGS. 9-10).

Figure 1:
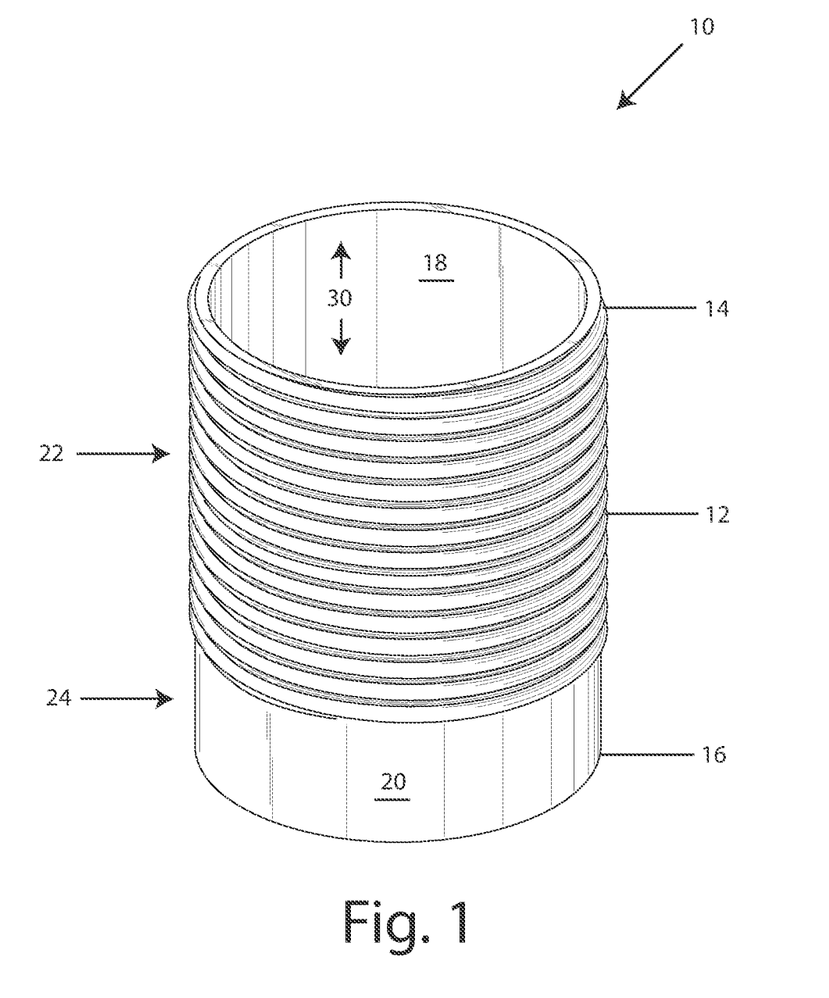
FIG. 1 of the drawings is a perspective view of a connector in accordance with the present invention.
Figure 2:
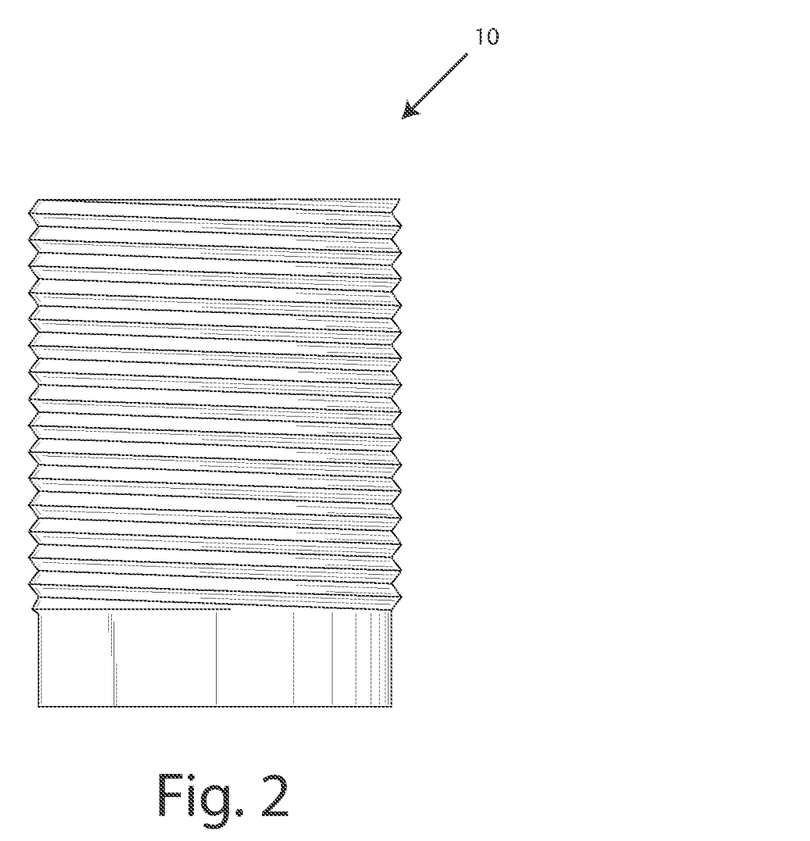
FIG. 2 of the drawings is a front view of the connector of FIG. 1.
Figure 3:
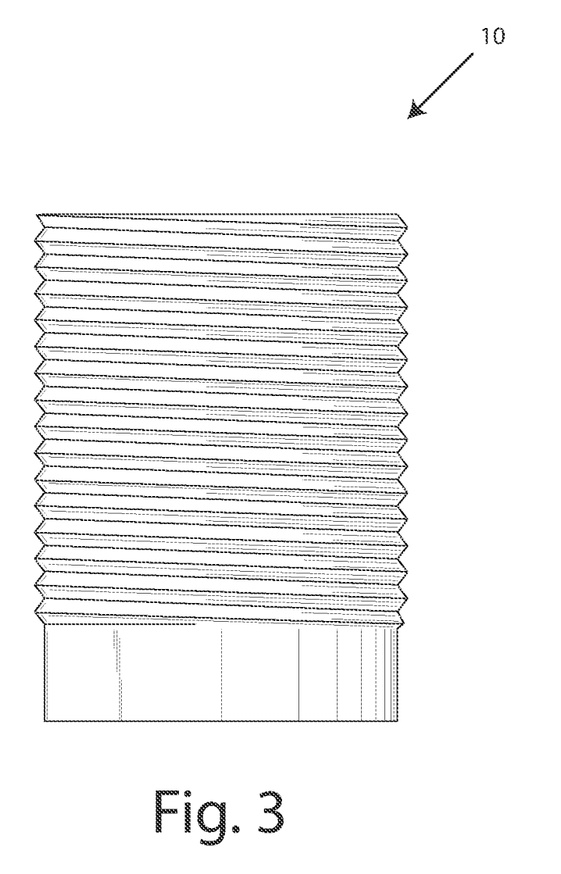
FIG. 3 of the drawings is a rear view of the connector of FIG. 1.
Figure 4:
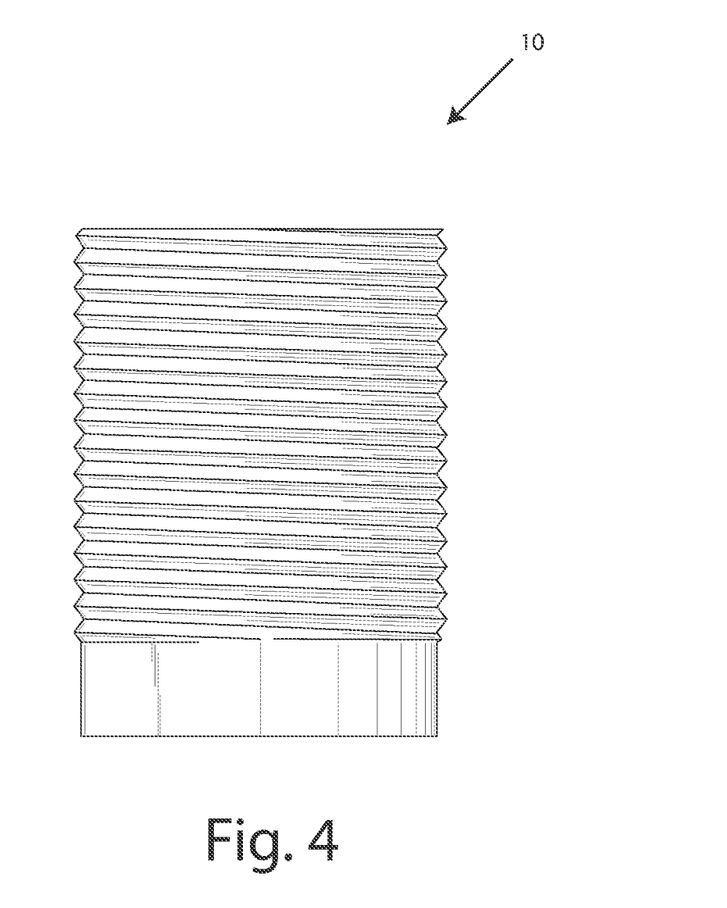
FIG. 4 of the drawings is a left side view of the connector of FIG. 1.
Figure 5:
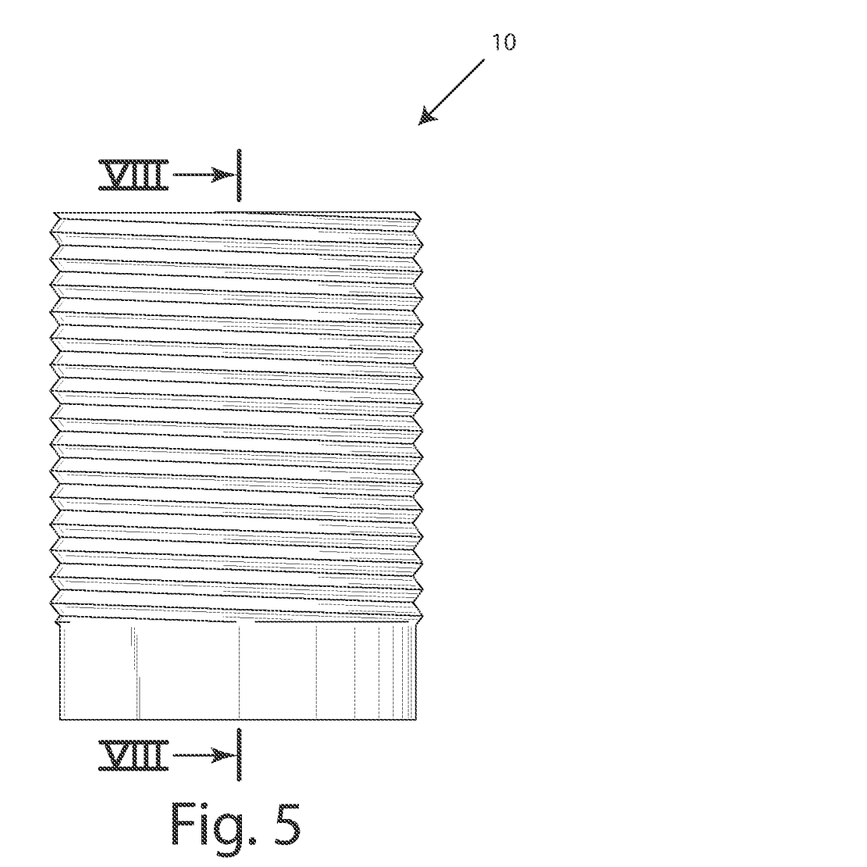
FIG. 5 of the drawings is a right side view of the connector of FIG. 1.
Figure 6:
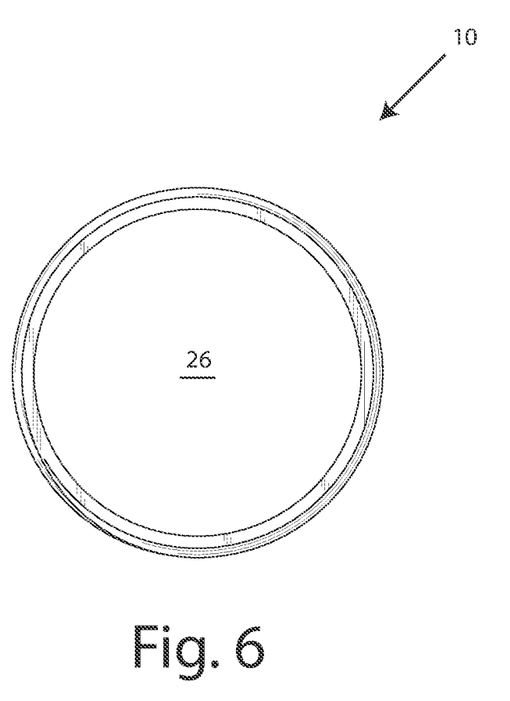
FIG. 6 of the drawings is a top view of the connector of FIG. 1.
Figure 7:
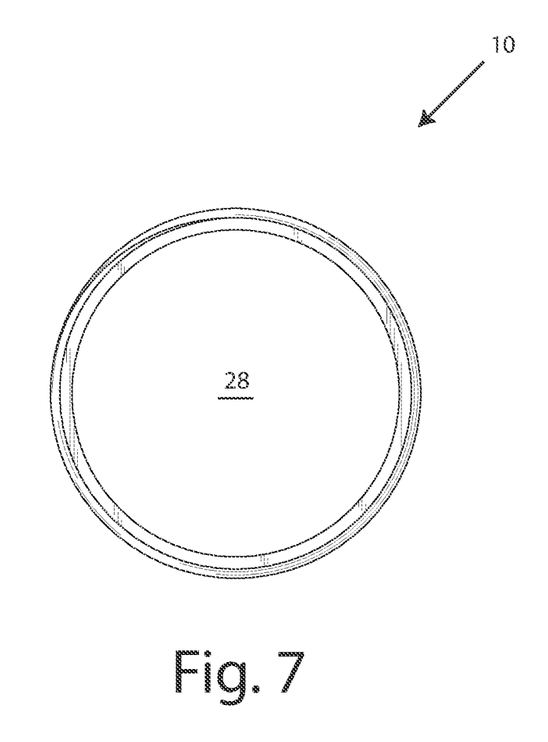
FIG. 7 of the drawings is a bottom view of the connector of FIG. 1.
Figure 8:
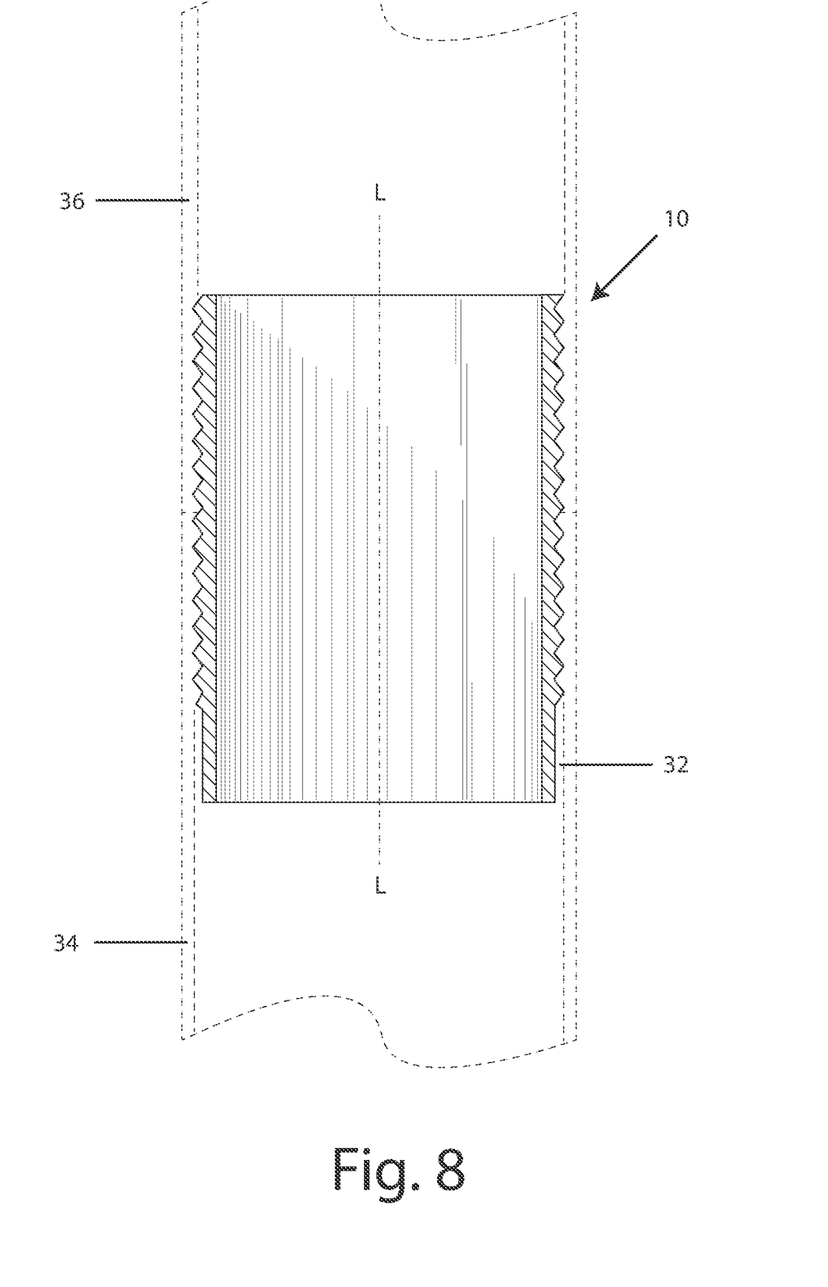
FIG. 8 of the drawings is a cross-sectional view of the connector taken along line VIII of FIG. 5.
Figure 9:
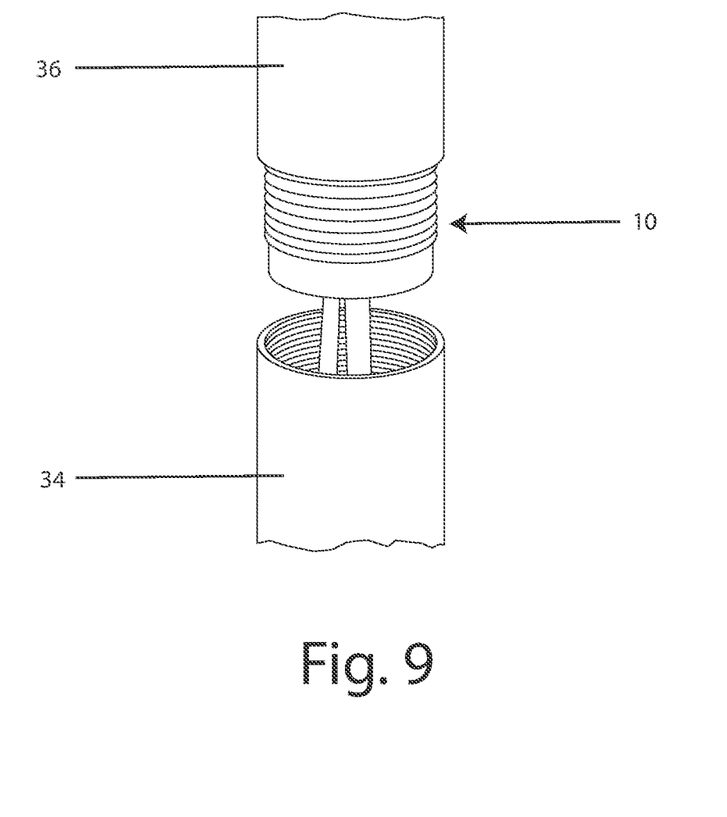
FIG. 9 of the drawings is a fragmented perspective view of a connector associated with a lighting assembly.
Figure 10:
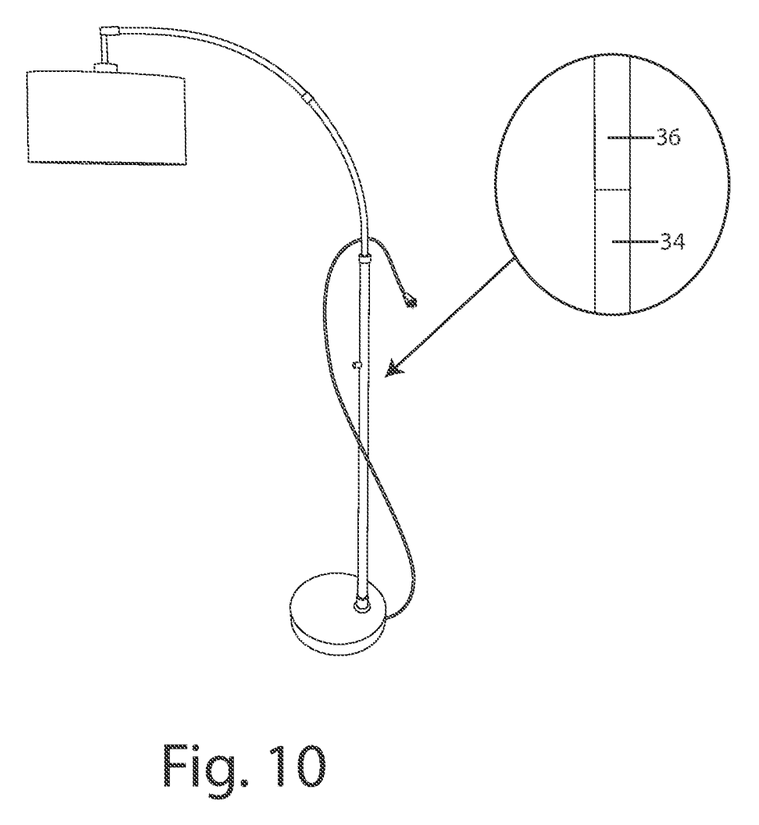
FIG. 10 of the drawings is a perspective view of a connector associated with a lighting assembly showing an aligned configuration.
Figure 11:
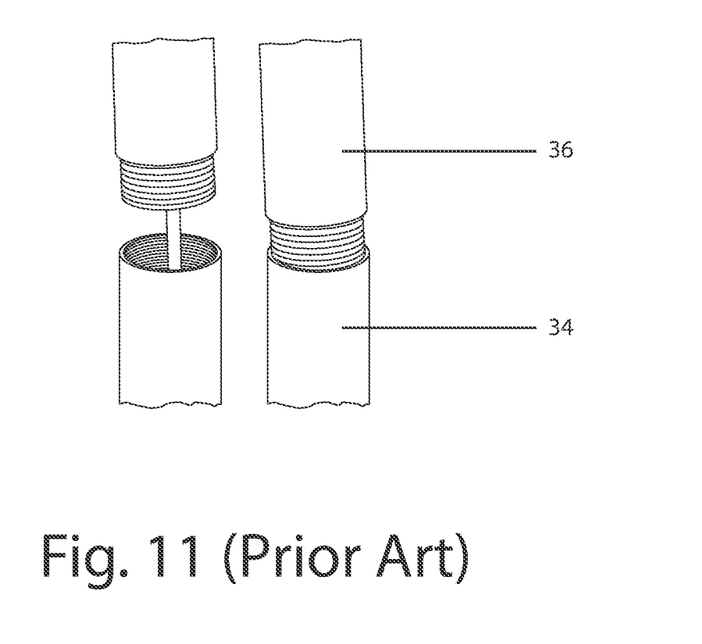
FIG. 11 of the drawings is a fragmented perspective view of a prior art connector associated with a lighting assembly.
Figure 12:
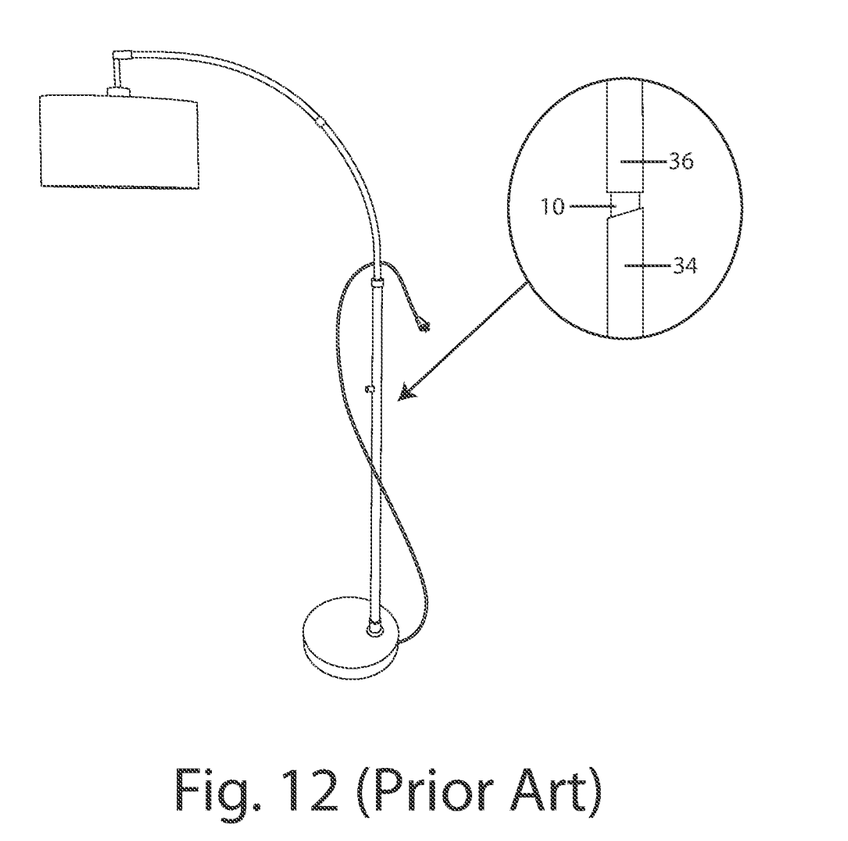
FIG. 12 of the drawings is a perspective view of a prior art connector associated with a lighting assembly showing a typical misaligned configuration due to cross-threading.

In accordance with the present invention, connector 10 allows a user to quickly and easily assemble, for example, components of a lamp or lighting assembly in an aligned configuration so that interface misalignment seams are minimized and/or eliminated. As is best shown in FIGS. 8 and 10, and without being bound to any one particular theory, it is believed that small gap 32 between the non-threaded portion of the connector and the interior sidewall of lower lamp component (e.g., lower rod) 34 facilitates the desired alignment quickly and easily between lower lamp component 34 and upper lamp component 36. By way of contrast and as is shown in FIGS. 11 and 12, conventional, fully-threaded connectors do not allow for easy and cooperative threaded alignment of lamp components, which often times results in an undesirable misaligned component interface or gap—between, for example, lower and upper components 34 and 36, respectively.

In a preferred embodiment of the present invention, the ratio of surface area of the threaded portion of the exterior sidewall of the body to the non-threaded portion of the exterior sidewall of the body ranges from approximately 1:1 to approximately 10:1, more preferably ranges from approximately 4:1 to approximately 6:1, and most preferably is approximately (i.e., +/−15 percent) 5:1.

In accordance with the present invention, connector 10 comprises a unitary and/or monolithic body fabricated from a metal, a metal alloy, a natural resin, a synthetic resin, a plastic, a composite, wood, and/or combinations thereof.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A lighting assembly, comprising:
  a first generally tubular component, wherein the first generally tubular component includes an inner diameter and an outer diameter, and wherein at least a portion of an interior sidewall of the first generally tubular component is threaded;
  a second generally tubular component, wherein the second generally tubular component includes an inner diameter and an outer diameter, and wherein at least a portion of an interior sidewall of the second generally tubular component is threaded; and
  a connector, comprising:
    a one-piece body having a first end, a second end, an interior sidewall, wherein the entire interior sidewall includes a uniform diameter, and an exterior sidewall, and wherein the first end and the second end of the body are planar;
    wherein the first end and the second end of the body define a length therebetween;
    wherein a portion of the exterior sidewall of the body is threaded proximate the first end, and wherein the threaded portion of the sidewall includes an outer peripheral geometry, and further wherein the threaded portion of the sidewall is continuously threaded and devoid of an aperture;
    wherein a portion of the exterior sidewall of the body is non-threaded proximate the second end, and wherein the non-threaded portion of the sidewall includes an outer peripheral geometry, and further wherein the non-threaded portion of the sidewall is cylindrical, planar, and devoid of an aperture;
    wherein the outer peripheral geometry of the threaded portion of the sidewall is greater than the outer peripheral geometry of the non-threaded portion of the sidewall;
    a first aperture associated with the first end of the body;
    a second aperture associated with the second end of the body;
    a conduit positioned between the first aperture and the second aperture, wherein the conduit is adapted for containing an electrical cord from an associated lighting assembly; and wherein the first and second generally tubular components contact each other and are secured together with the connector, and wherein the first and second generally tubular components are in vertical alignment and have the same inner diameter and outer diameter, and wherein a gap is present between the entire non-threaded portion of the connector and the interior sidewall of the second generally tubular component such that the entire non-threaded portion of the connector does not contact the interior sidewall of the second generally tubular component;

wherein the threaded portion of the exterior sidewall of the connector is threadably secured to the threaded portions of the interior sidewalls of both the first and second generally tubular components; and wherein the ratio of surface area of the threaded portion of the exterior sidewall of the body of the connector to the non-threaded portion of the exterior sidewall of the body of the connector ranges from approximately 4:1 to approximately 6:1.

\* \* \* \* \*